United States Patent [19]
Cox, Sr. et al.

[11] 3,908,872
[45] Sept. 30, 1975

[54] HANDLE ACTUATED DISPENSING DEVICE

[76] Inventors: John F. Cox, Sr., 4231 River St., Willoughby, Ohio 44094; Edgar F. Nelboeck, 6605 Ridgeburg Blvd., Mayfield Heights, Ohio 44124; Robert E. Uline, 13906 Leroy Ave., Cleveland, Ohio 44135

[22] Filed: Nov. 16, 1973

[21] Appl. No.: 416,618

[52] U.S. Cl. .................................. 222/469; 222/162
[51] Int. Cl. ............................................. A47q 19/14
[58] Field of Search .......... 222/162, 246, 310, 323, 222/324, 409, 469, 470, 472, 473, 494, 496, 499, 518, 525, 507, 509, 199, 189, 225, 465, 163

[56] References Cited
UNITED STATES PATENTS

| 784,811 | 3/1905 | Sinclair | 222/469 |
|---|---|---|---|
| 964,908 | 7/1910 | Gerling | 222/469 |
| 1,173,305 | 2/1916 | Phelan | 222/469 |
| 1,951,303 | 3/1934 | Davenport | 222/323 |
| 2,604,858 | 7/1952 | Bosa | 222/323 |
| 2,606,699 | 8/1952 | Andricks | 222/470 |
| 2,668,427 | 2/1954 | Seeley | 222/469 |
| 3,167,040 | 1/1965 | Byars et al. | 222/469 |
| 3,224,644 | 12/1965 | Davis | 222/162 |
| 3,543,814 | 12/1970 | Aluotto | 222/162 |

*Primary Examiner*—Robert B. Reeves
*Assistant Examiner*—H. Grant Skaggs, Jr.

[57] ABSTRACT

There is disclosed a dispensing device of cup-like form in which a conical bottom is provided to engage a tubular body, each being connected to a handle formed of elements resiliently connected together whereby manipulation of the elements by squeezing the same will effect separation of the body in part to permit discharge of material supported in the device in a ring-like pattern around the axis of the device.

1 Claim, 5 Drawing Figures

U.S. Patent    Sept. 30,1975    3,908,872
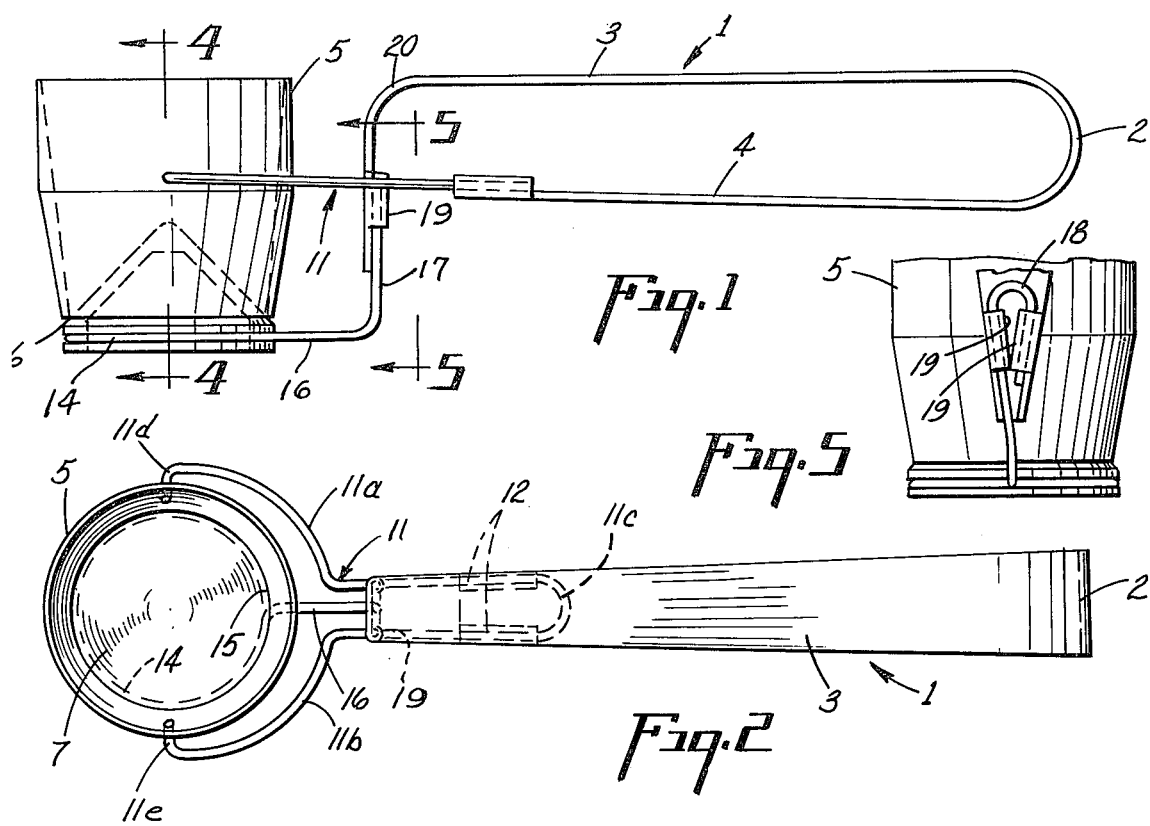
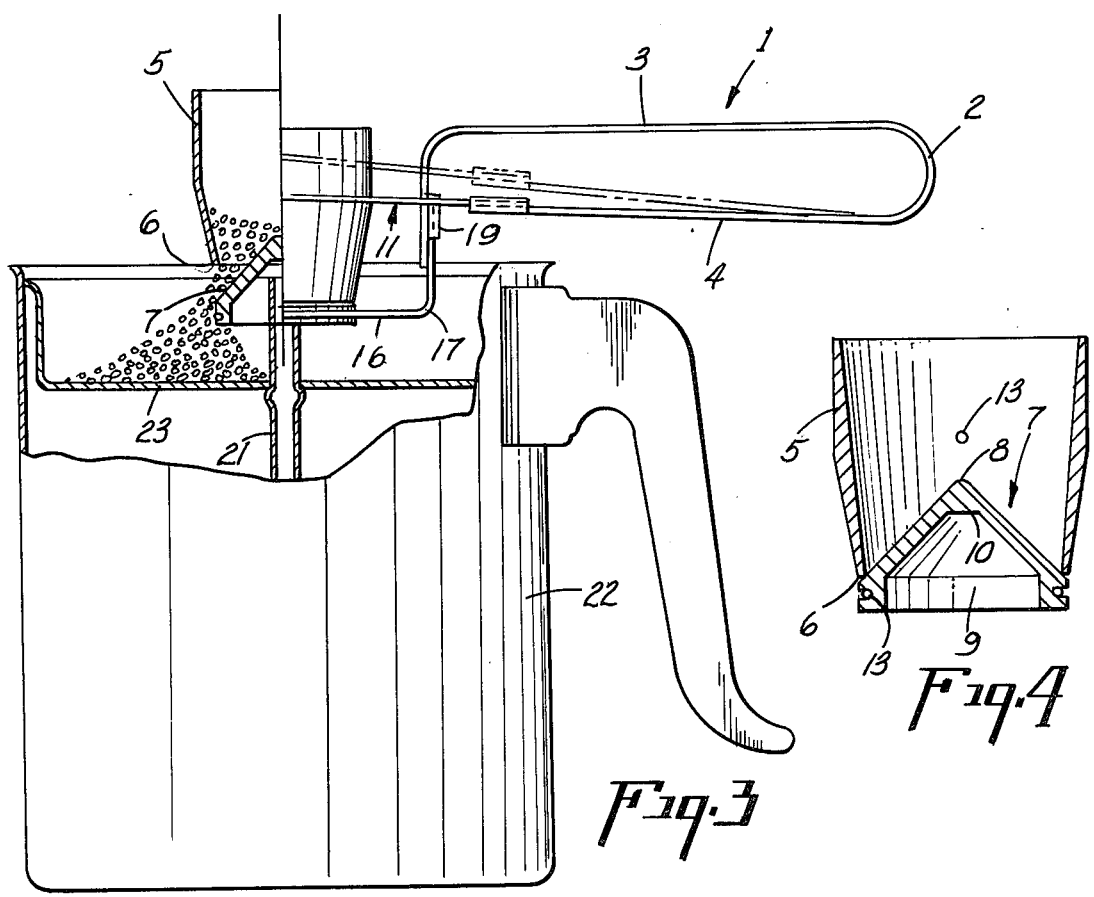

HANDLE ACTUATED DISPENSING DEVICE

OBJECTS OF THE INVENTION

It is a principal object of this invention to provide a dispensing device for directing a measured amount of material such as coffee or similar substance into a place where the ultimate discharge is to be in a ring-like formation and avoid directing any part of the material discharged into the usual stand pipe or the like in a device such as a coffee percolator.

A further object of the invention is to provide a dispensing device which involves the use of a tubular body, having a bottom movable with respect thereto, the same being positioned with regard to one another by means of a handle unit which is connected to each so that by the inherent resiliency of the handle the parts are normally maintained in contact but may be separated so as to permit the discharge of material from the interior of the body.

A further object of the invention is to provide a construction of dispensing device in which the handle unit is arranged so as to be comprised of the U-shaped member of suitable form having a resilient connection with the extremities of the handle unit connected to a body and a part comprising the bottom, which part is conical in shape and will thus discharge the material in the body when the two parts are separated in a formation of ring-like nature.

A further more detailed object of the invention is to provide a dispensing device of the class described in which the handle unit is provided with elements connected together by resilient means, in turn connected with a body of tubular nature and the bottom of conical form whereby the parts are substantially adjustable with regard to one another and are brought into alignment automatically by the engagement of the body and part, the engagement being such that material of even very liquid nature may be availed of to be discharged likewise.

Other and further objects of the invention will be understood from a consideration of the specification appended hereto, and disclosed in the drawing wherein:

FIG. 1 is a side elevational view of the device of this invention.

FIG. 2 is a top plan view of the device shown in FIG. 1.

FIG. 3 is a partly sectional view, somewhat fragmentary in nature, disclosing the device as arranged in use and illustrating the manner of operation thereof.

FIG. 4 is a sectional view, taken about on the line 4—4 of FIG. 1, looking in the direction of the arrows.

FIG. 5 is a fragmentary view, taken about on the line 5—5 of FIG. 1, looking in the direction of the arrows.

DESCRIPTION OF THE INVENTION

Referring initially to FIG. 1, the dispensing device of this invention is shown as being comprised of a handle unit generally denoted 1 which is of substantially U-shaped form in side view as noted, being made of suitable metallic substance or plastic, as the case may be, where a resilient connection 2 is afforded between the elements comprising the handle unit, generally designated 3 and 4.

The dispensing portion of the device is of cup-like form as has been suggested previously, with a body member 5 of substantially tubular or cylindrical form as suggested in section in FIG. 4, and may be shaped as desired to make the same attractive and at the same time provide for engagement at the lower end thereof designated 6 by a closure part 7 which is of conical form having the apex 8 and the hollowed interior 9 terminating at its upper end in a flat surface such as 10.

It will be noted that the closure part 7 extends as to the conical portion thereof into the interior of the body member 5 and as such operates to close the lower opening of the body member 5, the opening being designated 6 as previously noted, so as to contain therewithin material of whatever nature desired to be dispensed from the device.

The lower handle element 4 as noted in FIG. 1, has extending therefrom a wire unit in the form of a bail 11, more particularly shown in FIG. 2 as including a continuously formed part having the ends 11a and 11b connected together by the mounting portion 11c.

The mounting 11c is engaged with the handle element 4 by means of crimping the ends thereof as suggested at 12 to thereby positively grip the end 11c of the member 11.

The parts 11a and 11b are bent at their extremities to provide trunions 11d and 11e which engage suitable openings such as 13 as suggested in FIG. 4 to thereby pivotally mount the body member 5.

The conical closure part 7 is furnished with a peripheral groove 13 at its lower end, this being cylindrical, so as to receive therein a formed wire part suggested in dotted lines in FIG. 2 as including the circumferentially extending section 14 terminating at the end 15 adjacent the offstanding portion 16 which is in turn bent upwardly at right angles as indicated at 17 in FIG. 3, the terminal portion being provided with a reversely bent section 18 connected by crimping the appropriate ears such as 19 formed at the extremity of the upper handle element 3 as clearly disclosed in FIGS. 1 and 3.

It will be noted that the extremity of the handle element 3 is bent downwardly at 20, passing between the parts 11a and 11b to engage the wire member 14, this being spring-like in nature so that the end 15 will move with respect to the portion 16 in such a manner as to enter the groove 13 and maintain the closure part 7 in relatively fixed position.

From the foregoing, it will be understood that by appropriately manipulating the handle unit 1 as by squeezing the elements 3 and 4 together, the body 5 and closure part 7 may be separated so as to assume the condition such as suggested in FIG. 3 by the half disclosure, and partly in dotted line, to permit material within the body member 5 to flow downwardly around the conical closure part 7 and be discharged in a ring-like form into a coffee percolator basket as is suggested herein.

It will be understood that the conical part 7 is arranged so that the same will extend over and around the upper end of the tube 21 of the percolator 22 and permit coffee or the like to be directed into the basket such as 23, without passing downwardly into the tube 21. Because of the pivotal interconection of the body and the parts 11a and 11b of the lower handle element 4, the cylindrical or tubular body 5 will always be seated in a substantially sealed condition with regard to the conical part 7, and thus maintain material disposed within the same for dispensing in the manner herein described, whether coffee or like material.

It will also be understood that the body 5 will provide for a measured quantity of material to be dispensed in ring-like form as heretofore described.

We claim:

1. In a dispensing device for bottom discharge in combination, a tubular body member open at both ends, a conical closure part with the apex extending into the member and the lower extremity outside said member, said part comprising means to close said body at one end whereby material may be supported therein, and means to move said part into and out of engagement with the body comprising a handle unit having shiftable elements forming a generally U-shaped unit with a resilient connection between the elements thereof, said elements being normally substantially parallel, the extremity of one element being pivotally connected to the other member, and the extremity of the element engaged to the part externally of the member, said elements being resiliently interconnected to normally urge the member and part into closing relationship and arranged such that pressure exerted on said elements will separate the part and member to allow discharge of material from said member.

* * * * *